(12) United States Patent  
Green

(10) Patent No.: US 7,650,603 B2  
(45) Date of Patent: Jan. 19, 2010

(54) RESOURCE MANAGEMENT FOR VIRTUALIZATION OF GRAPHICS ADAPTERS

(75) Inventor: Dustin L. Green, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 471 days.

(21) Appl. No.: 11/177,084

(22) Filed: Jul. 8, 2005

(65) Prior Publication Data

US 2007/0008324 A1 Jan. 11, 2007

(51) Int. Cl.
G06F 9/46 (2006.01)
G06F 15/00 (2006.01)
G06T 1/00 (2006.01)

(52) U.S. Cl. .......... 718/104; 718/100; 345/501

(58) Field of Classification Search .......... 718/104; 345/501
See application file for complete search history.

(56) References Cited

U.S. PATENT DOCUMENTS

| | | | | |
|---|---|---|---|---|
| 4,870,406 A | | 9/1989 | Gupta et al. | 345/506 |
| 4,954,970 A | * | 9/1990 | Walker et al. | 345/639 |
| 5,764,242 A | | 6/1998 | Park | 345/501 |
| 6,437,788 B1 | | 8/2002 | Milot et al. | 345/552 |
| 6,658,564 B1 | * | 12/2003 | Smith et al. | 713/100 |
| 6,750,870 B2 | | 6/2004 | Olarig | 345/531 |
| 2001/0047438 A1 | * | 11/2001 | Forin | 710/18 |
| 2005/0057565 A1 | * | 3/2005 | Iwaki | 345/426 |
| 2005/0063586 A1 | * | 3/2005 | Munsil et al. | 382/162 |
| 2005/0108715 A1 | * | 5/2005 | Kanai et al. | 718/100 |
| 2005/0123282 A1 | * | 6/2005 | Novotny et al. | 386/111 |
| 2005/0289648 A1 | * | 12/2005 | Grobman et al. | 726/12 |

* cited by examiner

*Primary Examiner*—Kee M Tung
*Assistant Examiner*—Jacinta Crawford
(74) *Attorney, Agent, or Firm*—Woodcock Washburn LLP

(57) ABSTRACT

Mechanisms are provided for the sharing of graphics adapter resources among multiple partitions in a virtual machine environment. A first mechanism allows for the sharing of graphics adapter resources so that one partition, a video service partition, containing a graphics proxy process, can use this graphics proxy process to offer graphics adapter resources to another partition, a video client partition. The graphics proxy process controls access time by any given partition to the graphics adapter resources. In one aspect, it uses a time bank to control access time, and the time bank controls how long a virtual graphics adapter offered to the video client partition can access the graphics adapter resources. A second mechanism synchronizes virtual memory in the video client partition to virtual memory in the video service partition. A third mechanism allows for multiple video client partition overlays using a pixel-shader-based virtual overlay mechanism.

1 Claim, 18 Drawing Sheets

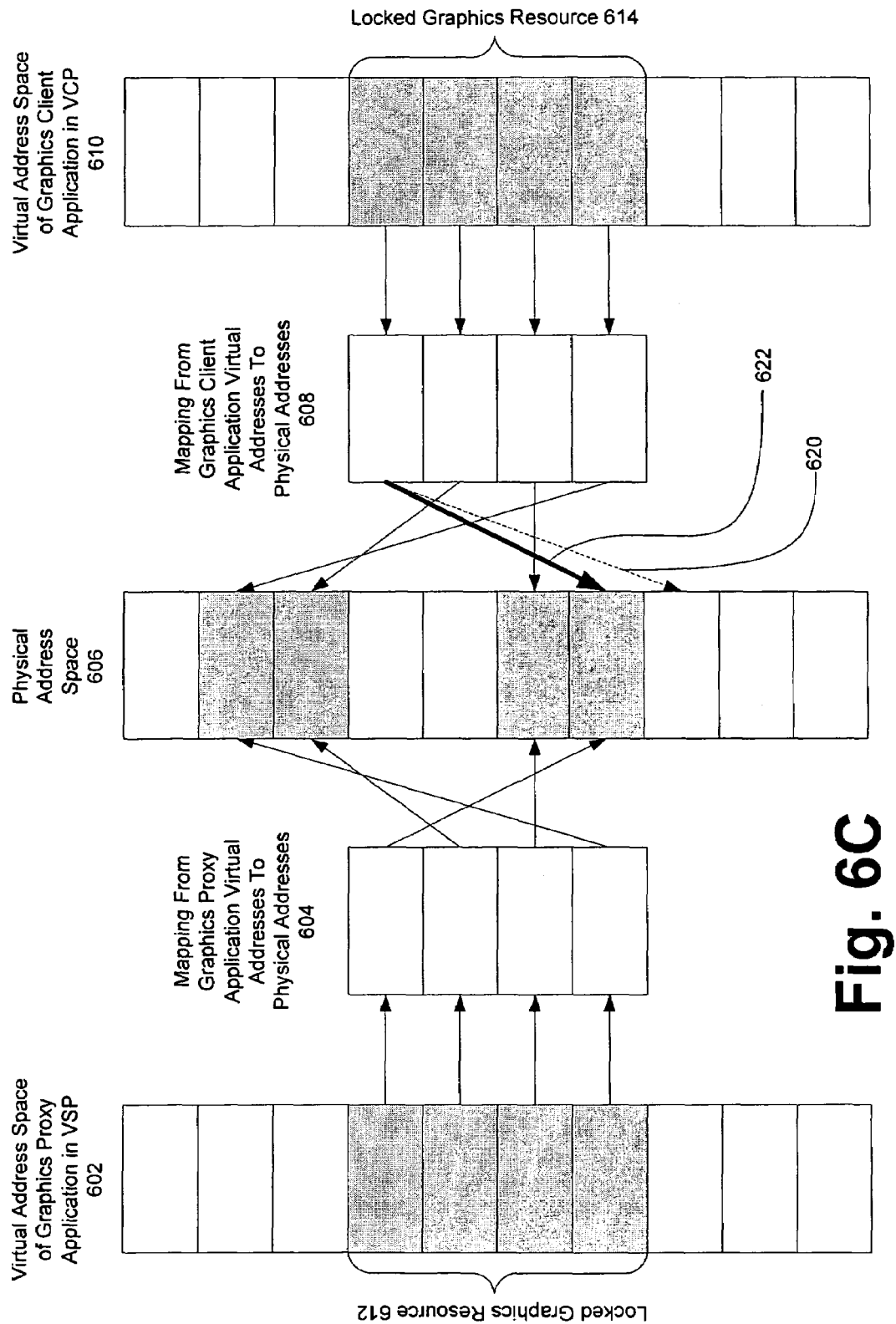

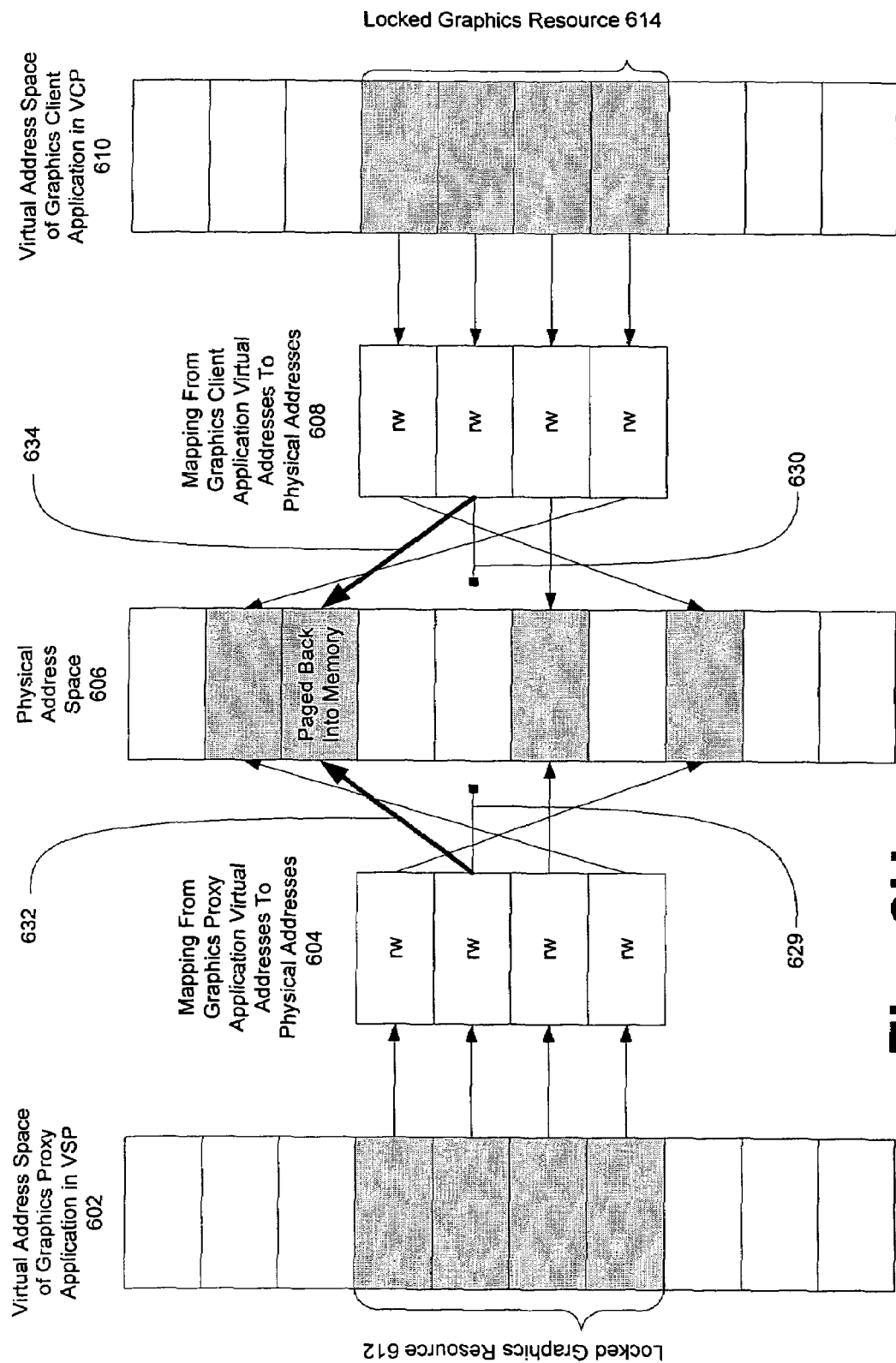

RESOURCE MANAGEMENT FOR VIRTUALIZATION OF GRAPHICS ADAPTERS

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2005, Microsoft Corp.

BACKGROUND

In a typical virtual machine environment, multiple virtual machines or "partitions" run on top of virtualizing software. This software, in turn, runs on top of hardware. The virtualizing software exposes the hardware in such a fashion that allows for a plurality of partitions, each with its own operating system (OS), to run on the hardware. The hardware is thus virtualized for the partitions by the virtualizing software.

Individual partitions are able to run disparate OSes, such as Windows, Linux, Solaris, MacOS and so on. These OSes can be isolated from each other such that if one OS in a partition crashes it will not affect other OSes in other partitions. Additionally, allowing multiple OSes to run on a single piece of hardware but in different partitions makes it easy to run different versions of software developed for different versions or types of OSes.

With regard to graphics programs running in various partitions, graphics resources for such programs should be sharable between the various partitions. Graphics resources include surfaces, textures, vertex buffers, index buffers, etc., that are used to render scenes. Applications need to create, load, copy, and use such resources. For example, textures are a powerful tool in creating realism in computer-generated 3-D images. Early computer-generated 3-D images, although generally advanced for their time, tended to have a shiny plastic look. They lacked the types of markings, such as scuffs, cracks, fingerprints, and smudges, that give 3-D objects realistic visual complexity. Some programs support an extensive texturing feature set, providing developers with easy access to advanced texturing techniques.

As another example, vertex buffers, which may be represented by some interface, are memory buffers that contain vertex data. Vertex buffers can contain any vertex type, transformed or untransformed, lit or unlit, that can be rendered through the use of the rendering methods. The vertices can be processed in a vertex buffer to perform operations such as transformation, lighting, or generating clipping flags. The flexibility of vertex buffers make them ideal staging points for reusing transformed geometry. Of course, textures and vertex buffers are merely two examples of graphics resources. As mentioned, surfaces, index buffers, and other graphics resources are contemplated herein, as those of ordinary skill in the art would readily recognize. An important problem lies in making sure that various partitions in a virtual machine environment have the appropriate access to such graphics resources.

SUMMARY

Various mechanisms are provided for sharing graphics adapter resources among multiple partitions in a virtual machine environment. In a first exemplary mechanism, a graphics proxy process is used. The graphics proxy process, located in a first partition, owns real graphics adapter resources and it can present these resources to a second partition via a virtual graphics adapter. The graphics proxy process controls the access time the second partition (or a third partition, for that matter) has to the graphics adapter computational resources. In one aspect, the graphics proxy process uses a time bank that can control not only inter-partition access time but also intra-partition access time among device contexts.

In a second exemplary mechanism, again the graphics proxy process along with a callback mechanism is able to synchronize the virtual memories of various partitions so that these partitions can have access to the same real physical memory, thus allowing such partitions to share the graphics adapter memory-based resources stored in the real physical memory. However, the first partition can use the graphics proxy process not only for synchronization, but also for handling page faults in the second partition. For example, if a page in the real physical memory has been paged out (e.g. to a disk), and an application in the second partition attempts to access the graphics adapter resources via its virtual memory and a page fault occurs, the graphics proxy process can page in the requested page so that the application can access the request memory-based graphics adapter resources.

Finally, a third exemplary mechanism is provided that allows for the creation of multiple video overlays in various partitions. A video overlay can not only be used in the first partition, discussed above, but also in a second or third partition. This mechanism uses at least pixel shaders to accomplish this task.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The foregoing Summary, as well as the following Detailed Description, is better understood when read in conjunction with the appended drawings. In order to provide useful illustrations, various aspects are shown. However, these aspects are not limiting to the specific aspects disclosed. Instead, the following exemplary figures are included:

FIGS. 6A, 6B, 6C, 6D, 6E, 6F, 6G and 6H illustrate low level mechanisms that allow for memory sharing among partitions;

DETAILED DESCRIPTION

Overview

Various mechanisms are provided for sharing graphics adapter resources among multiple partitions in a virtual machine environment. One mechanism allows for the sharing of graphics adapter computational resources based on the access time each partition can obtain from a graphics proxy process. Another mechanism, using the graphics proxy process and a callback mechanism, is able to synchronize virtual memories of partitions so that any selected partition has access via its virtual memory to the graphics adapter memory-based resources which are stored in real memory. Yet another mechanism allows multiple partitions to have a video overlay using only a single real graphics adapter resource. These teachings are preceded by a general overview of virtual machines to provide the appropriate context for the teachings.

Virtual Machines

Figure 1:
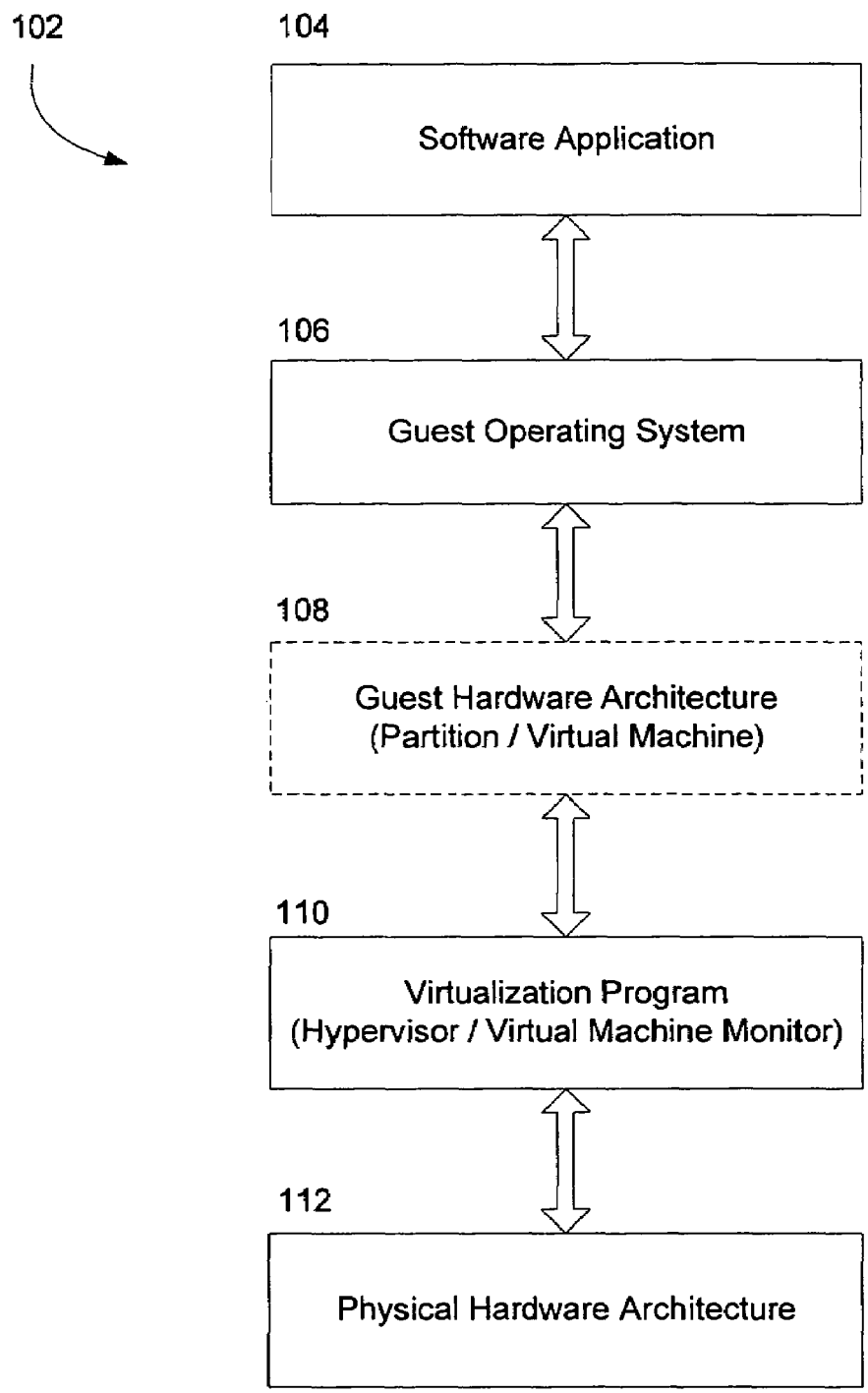
FIG. 1 is a block diagram representing the logical layering of the hardware and software architecture for virtualized operating environment in a computer system.

FIG. 1 is a diagram representing the logical layering of the hardware and software architecture for a virtualized environment in a computer system. In the figure, a virtualization program 110 runs directly or indirectly on the physical hardware architecture 112. The virtualization program 110 may be (a) a virtual machine monitor that runs alongside a host operating system or a host operating system with a hypervisor component wherein the hypervisor component performs the virtualization. The virtualization program 110 virtualizes a guest hardware architecture 108 (shown as dashed lines to illustrate the fact that this component is a partition or a "virtual machine"), that is, hardware that does not actually exist but is instead virtualized by the virtualizing program 110. A guest operating system 106 executes on the guest hardware architecture 108, and a software application 104 runs on the guest operating system 106. In the virtualized operating environment of FIG. 1, the software application 104 can run in a computer system 102 even if the software application 104 is designed to run on an operating system that is generally incompatible with a host operating system and the hardware architecture 112.

Figure 2A:
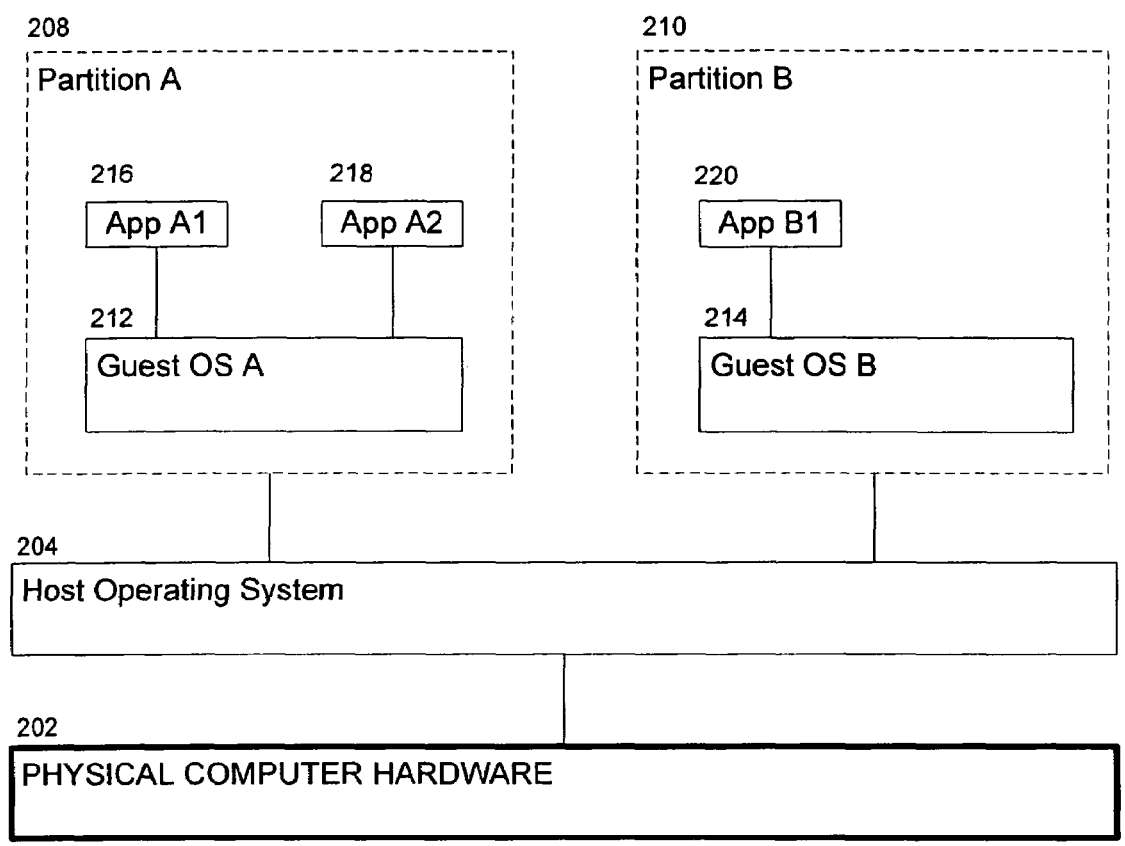
FIG. 2A is a block diagram representing a virtualized computing system wherein the virtualization is performed by the host operating system (either directly or via a hypervisor)

FIG. 2A illustrates a virtualized computing system comprising a host operating system (host OS) software layer 204 running directly above physical computer hardware 202, where the host OS 204 provides access to the resources of the physical computer hardware 202 by exposing interfaces to partitions A 208 and B 210 for the use by operating systems 212 and 214, respectively. This enables the host OS 204 to go unnoticed by operating system layers 212 and 214 running above it. Again, to perform the virtualization, the host OS 204 may be a specially designed operating system with native virtualization capabilities or, alternately, it may be a standard operating system with an incorporated hypervisor component for performing the virtualization (not shown).

Referring again to FIG. 2A, above the host OS 204 are two partitions, partition A 208, which may be, for example, a virtualized Intel 386 processor, and partition B 210, which may be, for example, a virtualized version of one of the Motorola 680X0 family of processors. Within each partition 208 and 210 are guest operating systems (guest OSs) A 212 and B 214, respectively. Running on top of guest OS A 212 are two applications, application A1 216 and application A2 218, and running on top of guest OS B 214 is application B1 220.

In regard to FIG. 2A, it is important to note that partition A 208 and partition B 214 (which are shown in dashed lines) are virtualized computer hardware representations that exist only as software constructions. They are made possible due to the execution of specialized virtualization software(s) that not only presents partition A 208 and partition B 210 to Guest OS A 212 and Guest OS B 214, respectively, but which also performs all of the software steps necessary for Guest OS A 212 and Guest OS B 214 to indirectly interact with the real physical computer hardware 202.

Figure 2B:
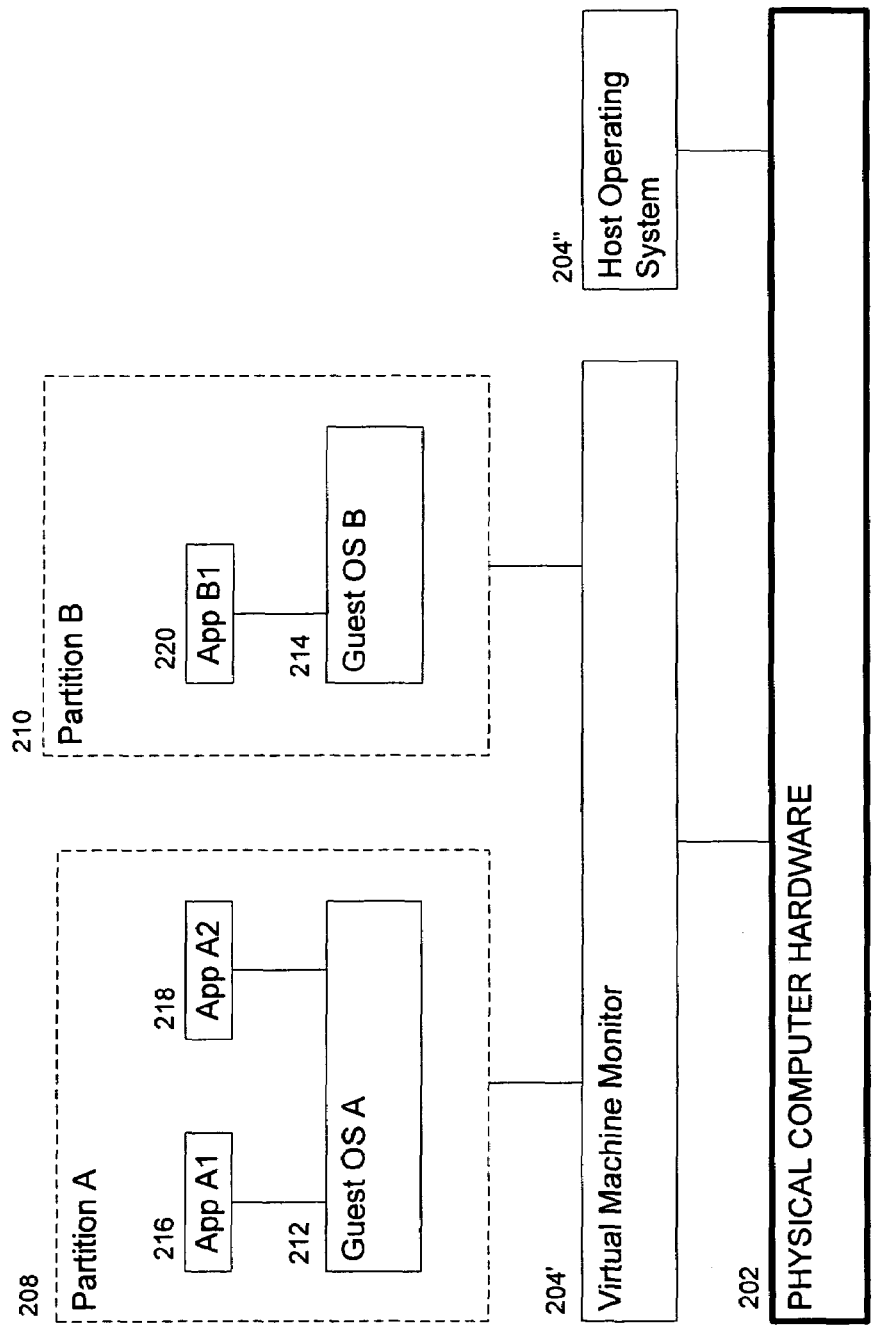
FIG. 2B is a block diagram representing an alternative virtualized computing system wherein the virtualization is performed by a virtual machine monitor running side-by-side with a host operating system.

FIG. 2B illustrates an alternative virtualized computing system wherein the virtualization is performed by a virtual machine monitor (VMM) 204' running alongside the host operating system 204". In certain cases, the VMM 204' may be an application running above the host operating system 204" and interacting with the computer hardware 202 only through the host operating system 204". In other cases, as shown in FIG. 2B, the VMM 204' may instead comprise a partially independent software system that on some levels interacts indirectly with the computer hardware 202 via the host operating system 204" but on other levels the VMM 204' interacts directly with the computer hardware 202 (similar to the way the host operating system interacts directly with the computer hardware). And yet in other cases, the VMM 204' may comprise a fully independent software system that on all levels interacts directly with the computer hardware 202 (similar to the way the host operating system interacts directly with the computer hardware) without utilizing the host operating system 204" (although still interacting with the host operating system 204" in order to coordinate use of the computer hardware 202 and avoid conflicts and the like).

All of these variations for implementing the above mentioned partitions are just exemplary implementations, and nothing herein should be interpreted as limiting the invention to any particular virtualization aspect.

Resource Management for Virtualization of Graphics Adapters

Figure 3:
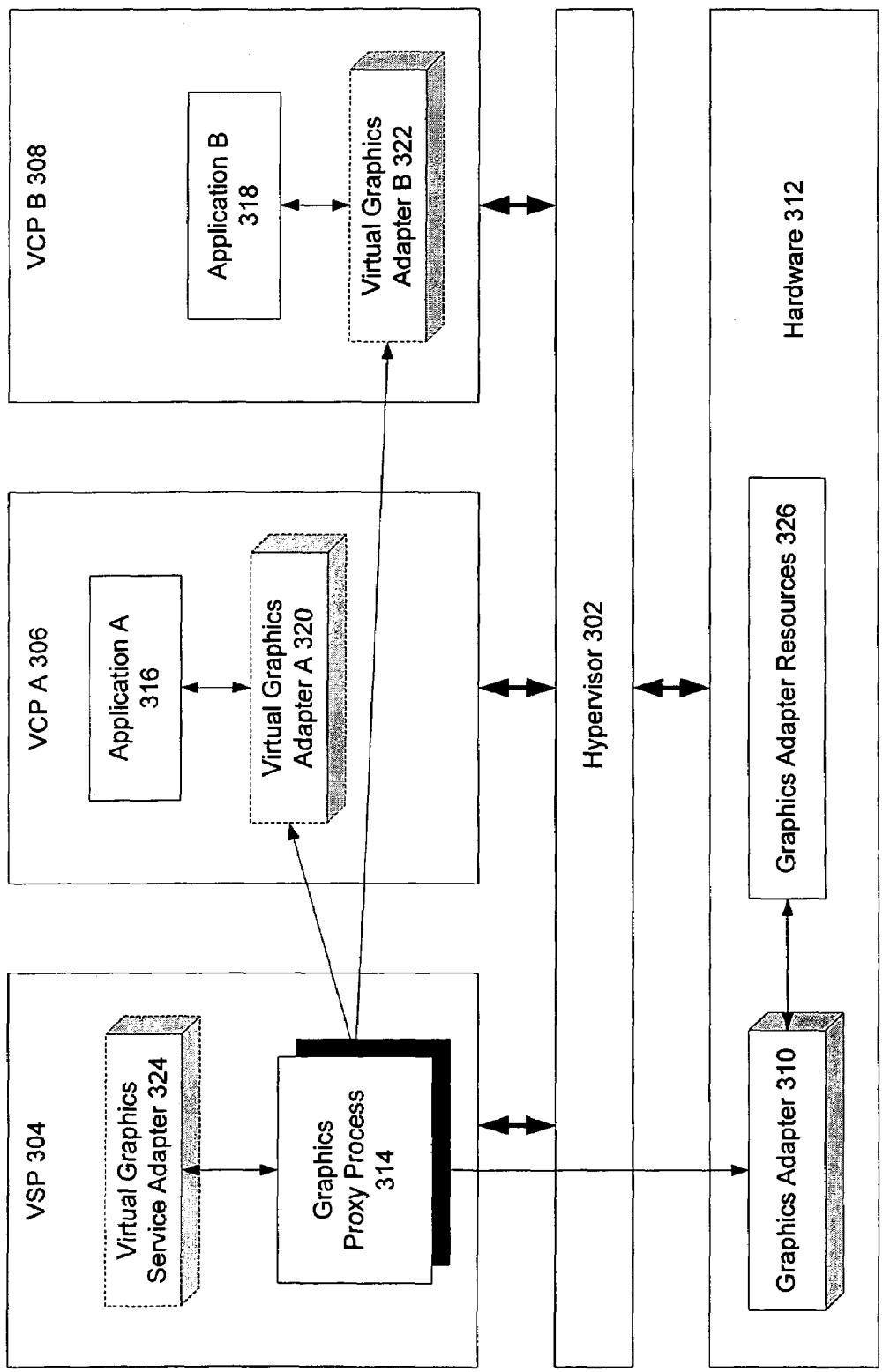
FIG. 3 illustrates a graphics proxy process that allows access to graphics adapter resources by virtualizing a graphics adapter to various partitions.

FIG. 3 illustrates a mechanism for the sharing of graphics adapter resources among multiple video client partitions (VCPs) in a virtual machine environment. In FIG. 3, a hypervisor 302 is illustrated, the hypervisor 302 maintains a video service partition (VSP) 304 and two VCPs, VCP A 306 and VCP B 308. Each of these partitions 304, 306, and 308 has some corresponding operating system running in it, whether Windows (XP, NT, ME, 2000, 98, 95, etc.), Linux, Unix, MacOS, IBM OS/2, etc. A graphics proxy process 314 located in the VSP 304, owns a graphics adapter 310 located in physical hardware 312. This graphics proxy process 314 creates virtual graphics adapters for partitions based on the real graphics adapter 310 that it owns. The graphics adapter 310, moreover, is coupled to some graphics adapter resources 326, such a video random access memory (VRAM) or just system random access memory (RAM).

The graphics proxy process 314 may present a virtual graphics service adapter 324 to the VSP 304, although this is not strictly required as another option is for other applications in the VSP 304 to use the same graphics adapter 310 in the same manner as process 314, by utilizing the adapter sharing mechanisms provided by the driver for 310 and the OS of VSP 304. More importantly, however, the graphics proxy process 314 presents a virtual graphics adapter A 320 to VCP A 305 and VCP B 308.

Such virtual graphics adapters, allow applications running in the VCPs to access graphics adapter resources 326 they may need. For example, application A 316 could interface with the virtual graphics adapter A 320 and through the graphics proxy process 314 ultimately access the graphics adapter resources 326.

One of the numerous advantages of the above system is that not only will graphics adapter resources 326 be offered to multiple client partitions, but also that applications within those partitions will be subject to greater control regarding their use of the graphic adapter resources 326. For example, the graphics proxy process 314 will be able to exercise greater control in the exemplary scenario where application A 316 attempts to take over all the entire graphic adapter resources 326 by allocating, say, a large number of graphics surfaces. In that situation, the graphics proxy process 314 can make sure that application B 318 is not starving for graphics adapter resources 326. This is of course just one typical scenario, and other scenarios are discussed below.

The VSP 304 runs the graphics proxy process 314, and the proxy process 314 services graphics-related requests made by any video client partition, such as VCP A 306 or VCP B 308. The proxy process 314 manages each graphics resource allocation requested by a VCP such that each virtual graphics adapter resource 326 (associated with a corresponding virtual graphics adapter, such as adapter A 320 and adapter B 322) appears to a VCP to always be allocated, active, and ready to be used by the corresponding graphics adapter. In reality, virtual graphics resources managed by the graphics proxy process 314 can be either active or inactive. If a virtual graphics resource is active, it means that the virtual graphics resource is currently associated with a real graphics resource which can be used by the virtual graphics adapter. If a virtual graphics resource is inactive, it means the virtual graphics resource does not have an associated real graphics resource that can be used the virtual graphics adapter. However, the contents of the inactive graphics resource are stored in system memory so that the state of the inactive virtual graphics resource is not lost when it becomes inactive. Furthermore, whenever a VCP uses an inactive virtual graphics resource, the resource is activated again.

Sometimes the initial activation of an inactive virtual graphics resource will fail because the virtual graphics adapter will not have the room to create the associated real graphics resource. In such a case, room will be created for the associated real graphics resource by deactivating other virtual graphics resources until there is room for the real graphics resource associated with the virtual graphics resource currently being used.

I. Processor Time Sharing

In another aspect, there are at least two scenarios where the graphics adapter 310 and the graphics adapter resources 326 might have to be shared among partitions, such as VCP A 306 and VCP B 308. The first scenario is time sharing of the GPU (Graphics Processing Unit) that is interfaced by the graphics adapter 310, discussed in this first section. The second scenario is memory sharing of the graphics adapter resources 326, discussed in the second section following this section.

Figure 4:
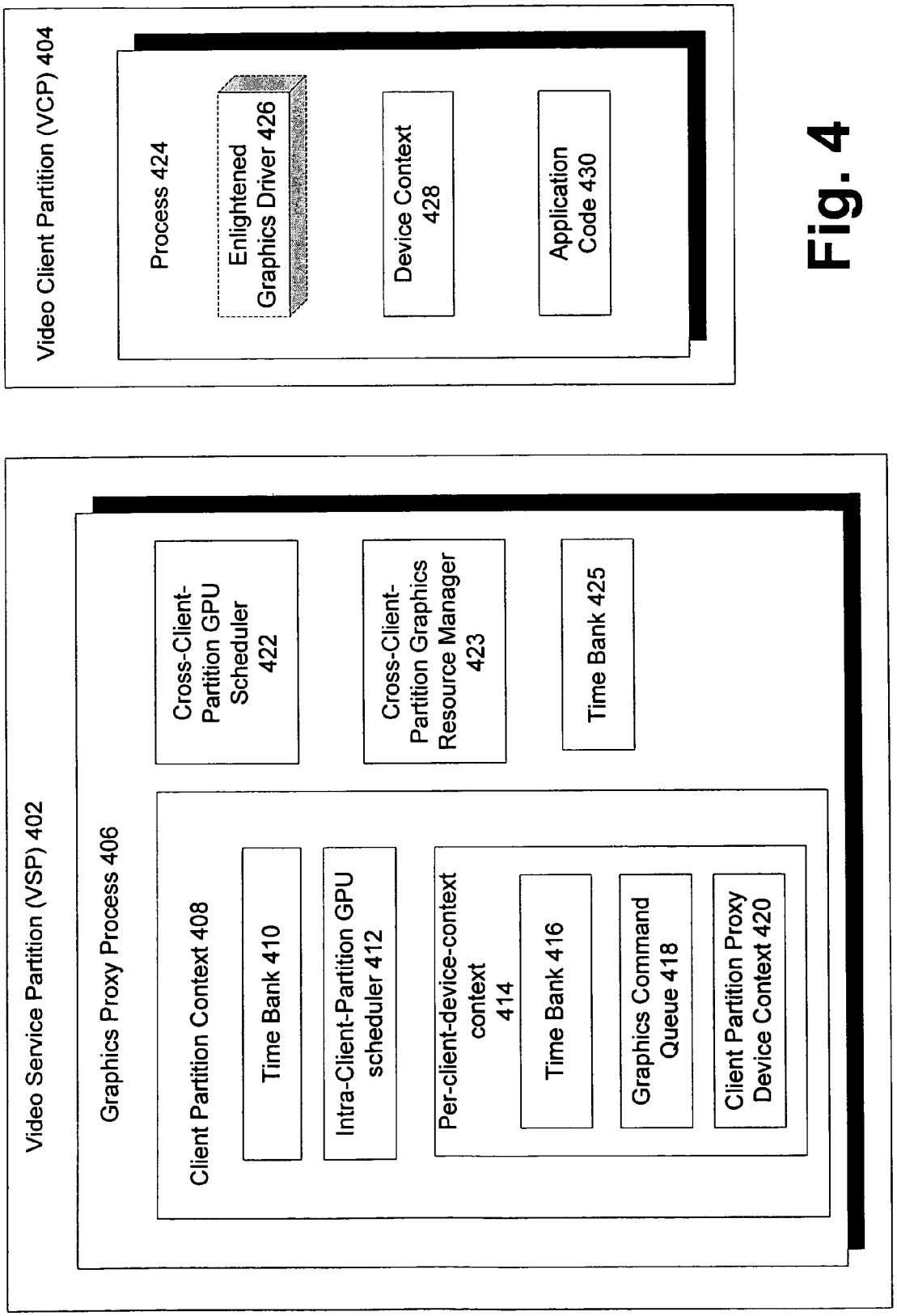
FIG. 4 illustrates a graphics proxy process that controls access time to graphics adapter resources using various mechanism, like a time bank.

FIG. 4 illustrates a typical video service partition (VSP) 402 and a typical video client partition (VCP) 404. The VSP 402 has in it a graphics proxy process 406, which is the same process discussed with reference to FIG. 3, above. The graphics proxy process 406 has a client partition context 408 that is under the control of the graphics proxy process 406. Several graphics device contexts may be present in a VCP 404, so there is a per-client-graphics-device-context context 414 in which applications can execute. In particular, there's a time bank 416 functionality that is a type of "bank account" of how much time a device context has to execute on a GPU. The time bank 416 is associated with the graphics command queue 418 that contains commands to be executed and the time bank 416 controls the amount of time commands can execute. For example, a typical client partition device context 420 can execute its commands 418 for a time allowed by the time bank 416. Moreover, there is also an intra-client-partition GPU scheduler 412 that schedules when client partition device contexts, such as client partition proxy device context 420, will be allowed to execute graphics commands. Client partition proxy device context 420 acts as a proxy for actual client partition device context 428.

A total time bank 410 for the entire client partition context 408 ensures that a particular client partition context, context 408 in this case, does not appropriate an inordinate amount of time executing its commands with respect to other client partition contexts. Furthermore, the graphics proxy process 406 also has a cross-client partition GPU scheduler 422 that schedules different client partitions, such as VCP 404 and some other VCP (not pictured), to spread out proportionately the amount of time each client partition as a whole will receive on the GPU. The Cross-client partition graphics resource manager 422 does an analogous proportionate doling out of graphics resources across the various VCPs that may be running in a typical virtual machine environment. Lastly, the time bank 425 for the graphics proxy process 406 ensures that each client partition as a whole receives a proportionate amount of GPU time with respect to other client partitions.

The VCP 404 may have some typical process (or application) 424 running in the VCP 404. Such a process 424 may have a graphics device context 428 used by some application code 430. Additionally, the VCP 404 may have an enlightened graphics driver 426 which communicates with the graphics proxy process 406 in the VSP 402.

In light of the discussion regarding FIG. 4, in order to share time on the GPU, each queue of graphics command buffers is associated with a corresponding video client partition for which it is holding graphics commands. Each time a graphics command buffer is run, the time it took to execute is measured. The graphics proxy process balances the GPU time given to each VCP according to the graphics priority of each VCP. If a particular VCP generates graphics command buffers that take an unusually long time to execute, future command buffers from that VCP are split into smaller command buffers to improve the granularity of scheduling. The opposite is also done—if command buffers from a particular VCP take an unusually short period of time to execute, then future command buffers from that VCP can be combined into larger command buffers. The splitting and combination of command buffers need not be the mechanism through which balance is achieved, rather it can be used merely to balance efficiency with scheduling granularity. As a further alternative, graphics device context prioritization features of VSP 402 may be utilized directly in order to assign the appropriate priority for client partition proxy device context 420. In this manner the need for explicit time banks within graphics proxy process 406 is avoided.

However, in another aspect, one mechanism used to balance time on the GPU is as follows (this is one example of a scheduling algorithm—others may be used as well). Each VCP has a "time bank", as discussed above with reference to FIG. 4, that starts empty, and can hold GPU time. Any time the command buffer queue is empty, the time bank is clipped to a particular maximum value. Preferably, VPCs that have command buffers in their command buffer queue can have positive time in their time bank that exceeds the cap value. Time is added to VCPs' time banks each "tick" of a scheduler. The scheduler rotates through the VPCs one at a time, executing command buffers for partitions that have positive time bank values (meaning they also have command buffers queued).

When the turn of a particular VCP arrives, command buffers are executed, and each one is timed. The time taken to execute each command buffer is subtracted from the time bank of that VPC, possibly taking that VPC to a negative time bank value. Command buffers will continue to be executed for that VPC until there are no more pending command buffers for that video client partition, or until the time bank for that video client partition becomes less than or equal to zero. Since little control can be exercised over other users of the graphics adapter in the video service partition, those users are ignored, and the time taken by those other users will be attributed reasonably randomly to the time banks of the VPCs. When a tick occurs and time is distributed out to VPC time banks, the available time is apportioned among those video client partitions that can take more time (some VPC may not be able to take more time because they may reach their cap value). The ratio of apportioned time can be determined by a priority mechanism. If all VPCs have reached their time bank cap, then it is possible for some of the time being distributed out to be thrown away because no VPC can use it. The cap keeps video VPCs from building up a huge time surplus that they could then use to run unchecked for extended periods at a later time.

As indicated above in FIG. 4, the above time-bank and command buffer queue can be either per-video-client-partition, or it can be a two level system, with the above-described apportioning of time among VPC, and very similar sub-apportioning of time among device contexts within each video client partition.

The VCP has a virtual graphics adapter driver that exposes what looks like a real graphics adapter to the video client partition, and communicates with the proxy application running in the video service partition. The proxy application in the video service partition looks like just another application that is using the GPU from the perspective of the video service partition.

It is also interesting to note that in the event that, for example, a surface or other graphics resource is reported lost to the graphics proxy application in the VSP, such a loss may need to be reported to the VCP, since unavoidable loss of surface data may have resulted, and the application running in the video client partition that owns the virtual surface will then be responsible for dealing with the surface lost error (a normal error that some applications are expected to be able to handle).

II. Memory Sharing

As mentioned above, there are at least two scenarios involving the sharing of resources. One scenario concerns the sharing of GPU time (as discussed above) and the other concerns the sharing of memory. With regard to this second scenario, sharing of memory resources entails the sharing of graphics adapter resources, such as video memory on a graphics adapter or system memory that is visible to the graphics adapter (perhaps through the accelerated graphics port aperture or another type of aperture).

Figure 5A:
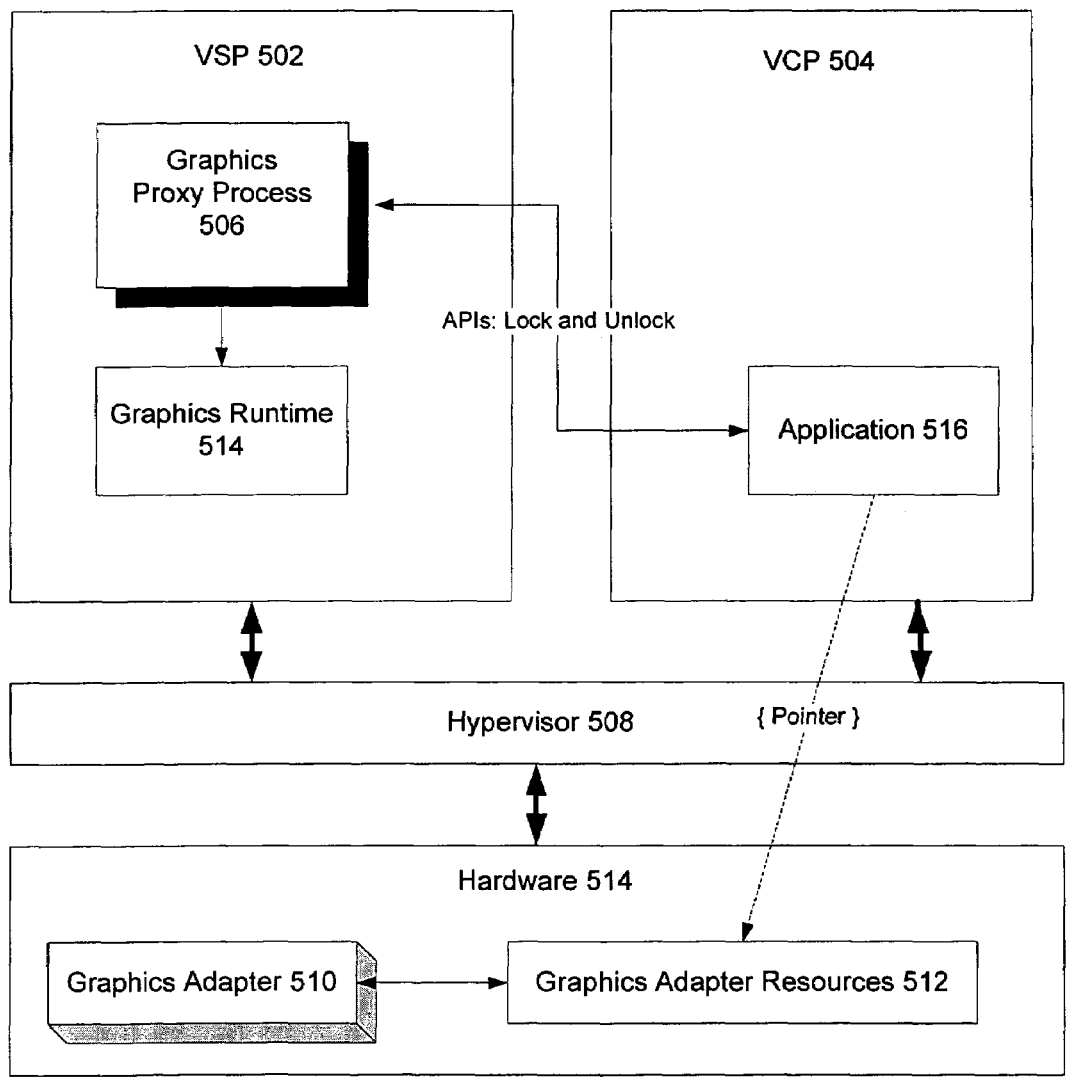
FIGS. 5A and 5B illustrate high level mechanisms that allow for memory sharing among partitions.

Thus, in one aspect, FIG. 5A illustrates a mechanism that is used to allow typical applications in various VCPs to access data contained in a graphics resource via a pair of API calls called Lock and Unlock. A graphics proxy process 506 running in a VSP 502, is communicatively coupled to a graphics runtime 514. The graphics proxy process 506 services Lock and Unlock APIs from some application 516 running in a VCP 504. These APIs return to the application 516 a pointer to the data contained in a graphics resource 512, and the application 516 can then use this pointer to read or write the data contained in the graphics resource 516 until the resource is Unlocked.

Figure 5B:
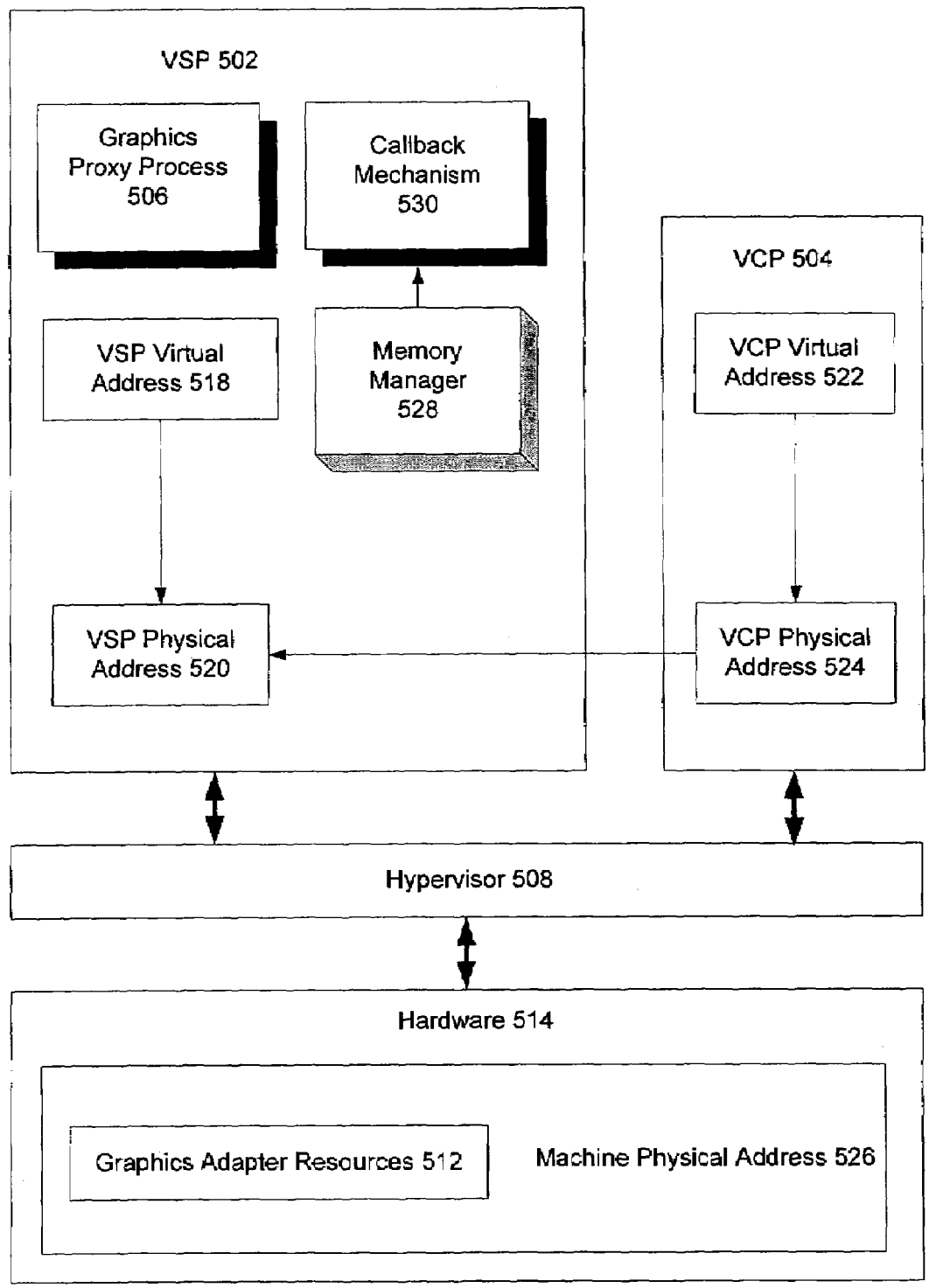

The pointer is returned by a VSP's 502 Runtime program 514, and it is a pointer into the virtual address space of the graphics proxy application, discussed in the previous figures. FIG. 5B illustrates the relationships of the various address spaces in the VSP and VCP. The graphics resource 512 is accessible and doesn't move in the virtual address space of the graphics proxy application 518 while locked, but the physical addresses 520 and 526 used to hold the underlying data may change. (The relationships between virtual partition addresses, physical partition addresses, machine physical addresses, partition page tables, and shadow page tables are discussed in more detail in patent application Ser. No. 11/128,665 filed May 12, 2005 titled "Enhanced Shadow Page Table Algorithms").

Because an access to a particular virtual address in the VCP 522 normally maps to a VCP physical address 524, which in turn maps to a machine physical address 526, the mapping from VCP physical address 524 to VSP physical address 520 would not normally be taken into account. A fixed mapping set up upon initial lock API call would cause accesses to a VCP virtual address 522 within a locked surface to map to the wrong machine physical address 526 if the Video Memory Manager 528 in the VSP 502 decided to change the physical pages 520 and 526 holding the graphics resource while it is locked. This would lead to incorrect data being read, data being written to the wrong physical page 520 and 526, and other undesirable problems. Also, the Video Memory Manger 528 on the VSP 502 is free to control the accessibility of the pages making up the virtual address range 518 exposed to the graphics proxy process 506 in order to implement things such as copy-on-write, or demand paging.

To address this above scenario, the video memory manager 528 exposes a callback mechanism 530. The callback mechanism 530 is invoked any time the physical pages 520 and 526 being used to store the data of a locked graphics resource 512 are changed, and any time the accessibility flags of pages being used to store the data of a locked graphics resource 512 are changed. Analogous changes are made to the VCP shadow page tables (not pictured) and the mapping from VCP physical address 524 to machine physical address 526 to effect the same access semantics and to enable direct access to the machine physical page 526 that corresponds to the appropriate VSP physical page 520 using a VCP virtual address 522.

Figure 6A:
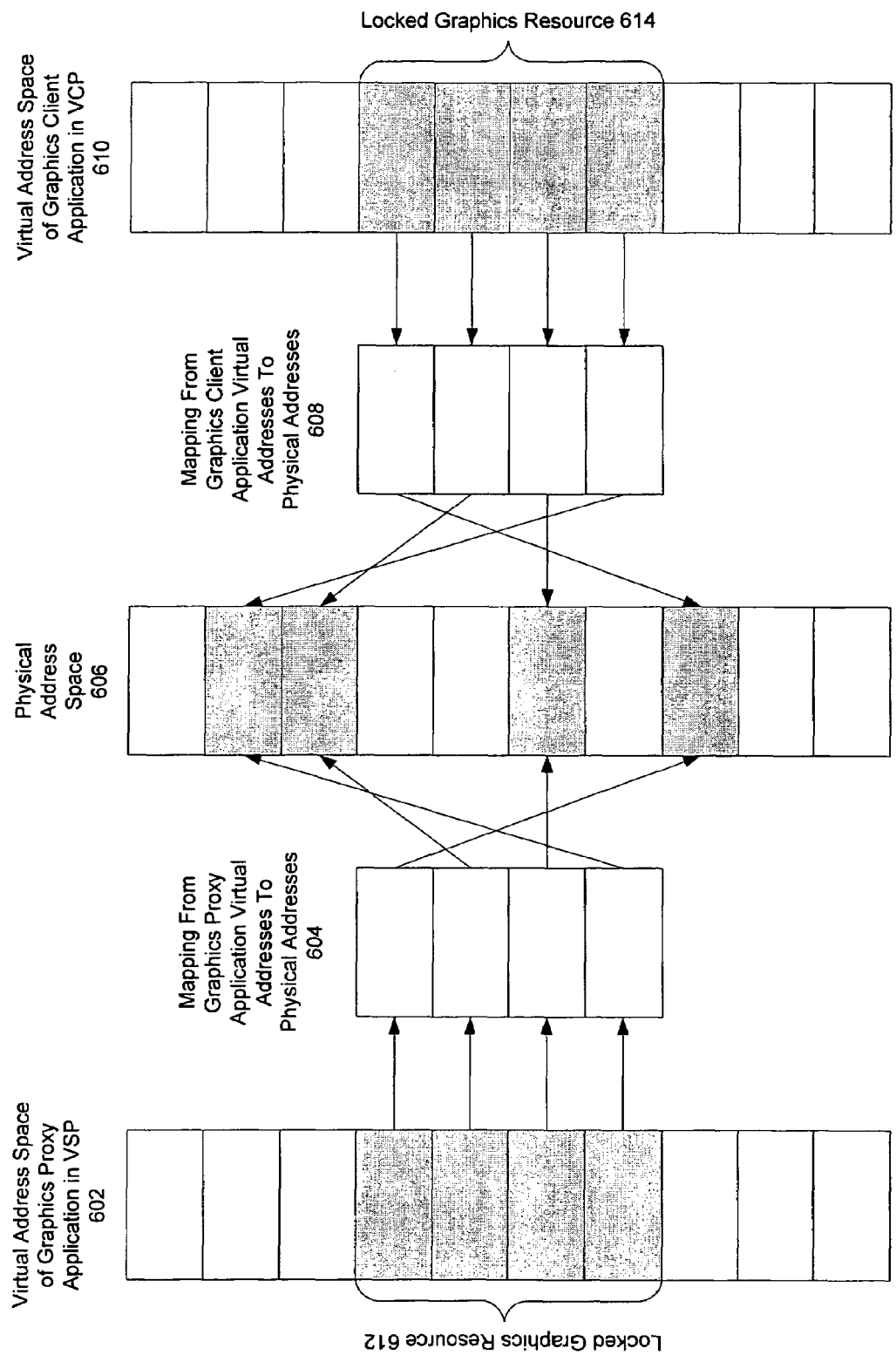

FIGS. 6A-6H illustrate snapshot pictures of what happens when physical pages underlying virtual pages are moved around and paged out of memory. In order for partitions to be able to share memory effectively, the various types of virtual-to-physical memory mappings must be synchronized between partitions. FIG. 6A illustrates a virtual address space of the graphics proxy application in VSP 602. This address space corresponds to space 518 in FIG. 5. Address space 602 maps 604 to a physical address space 606 (via partition physical address space, partition page table, shadow page tables, etc., not discussed herein) that may correspond to address space 526 in FIG. 5. Likewise, the virtual address space of a graphics client application 610 may map 608 to the physical address space 606. Both the virtual address space of the graphics proxy application in the VSP 602 and the virtual address space of the graphics client application in the VCP 610 can have some memory addresses that back corresponding pages of locked graphics resource 612 and 614, such that graphics resource 612 and 614 are backed by the same machine physical pages.

Figure 6B:
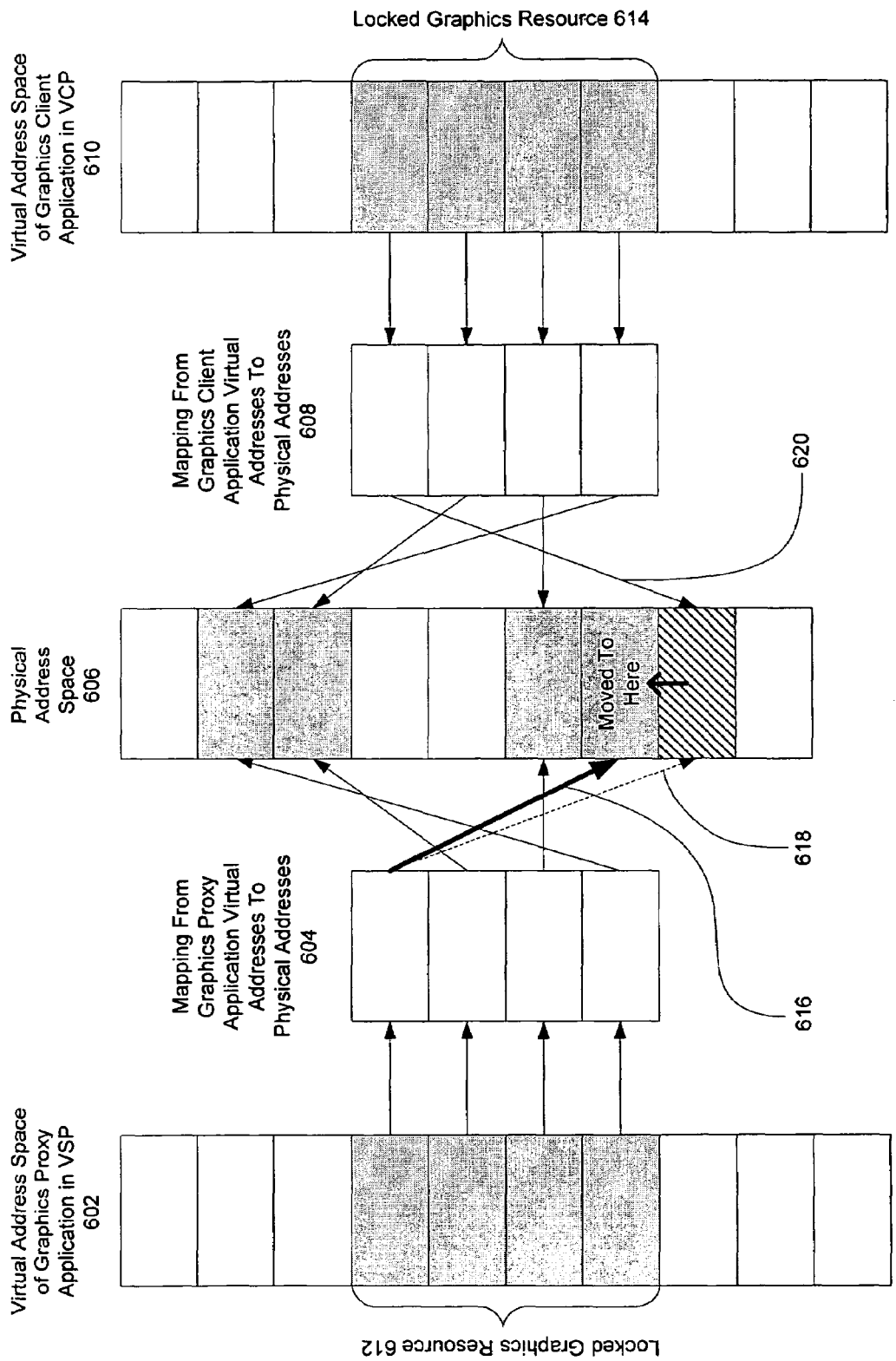

FIG. 6B illustrates what happens when a physical address changes, and how at least one of the mappings 604 must be updated. Thus, the original mapping 618 (in dashed line) must be discarded and replaced by a new mapping 616 (in bold line) because some data contained in an address space has changed locations. Notably, one of the VCP to machine physical address mappings, namely, mapping 620 has not been changed, which means that now the VCP virtual addresses 610 don't correspond to the proper machine physical addresses. As a result they also must be changed.

Figure 6D:
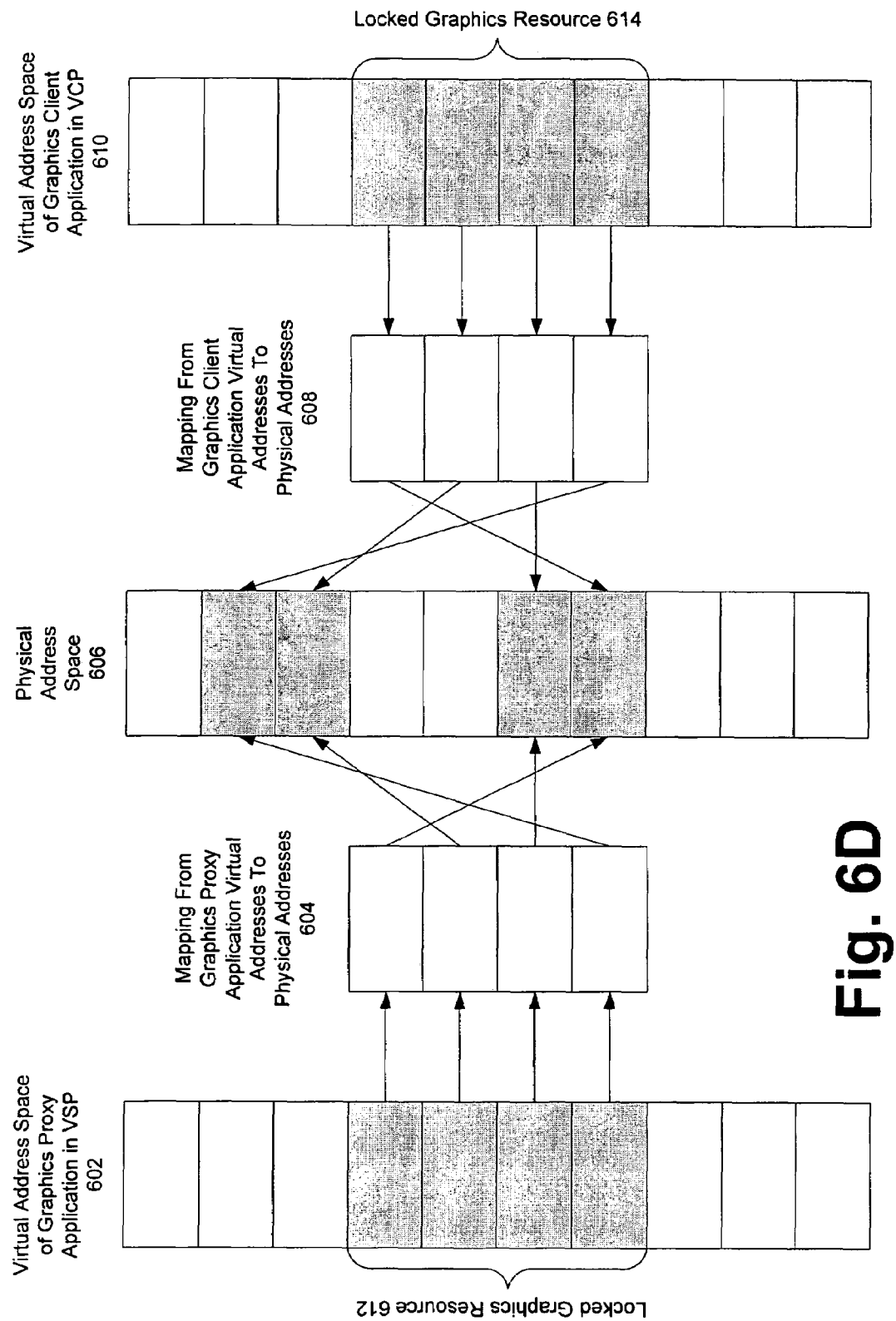

FIG. 6C illustrates the updating of the VCP virtual addresses 610 to the machine physical addresses 606. Thus, the dashed arrow represents the old mapping 620, while the bold arrow represents the new and updated mapping 622. So after this, both the VSP to machine physical address mappings 604 and the VCP to machine physical mappings 608 are properly updated and synchronized. FIG. 6D illustrates the synchronization between the VSP and the VCP that serves as the basis for memory sharing between the two partitions.

Figure 6E:
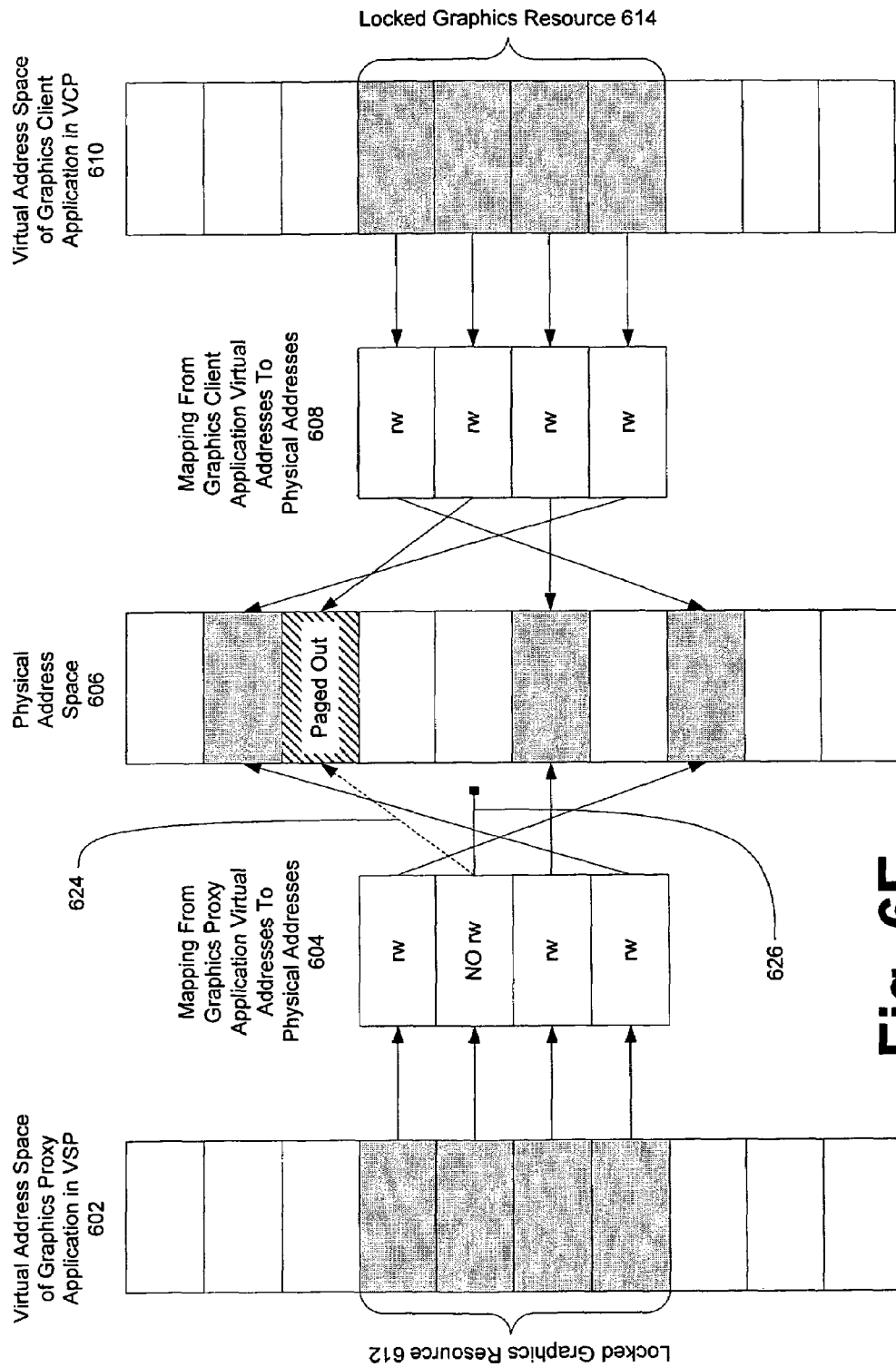

FIG. 6E illustrates what happens when one page of the graphics resource is paged out of machine physical memory 606. The page with diagonal lines is paged out of memory and a past mapping 624 is not longer valid. The new mapping 626 from the VSP virtual address no longer has a corresponding mapping to a page in machine physical memory 606. Nothing can be read or written ("NO rw") from such paged out page.

Figure 6F:
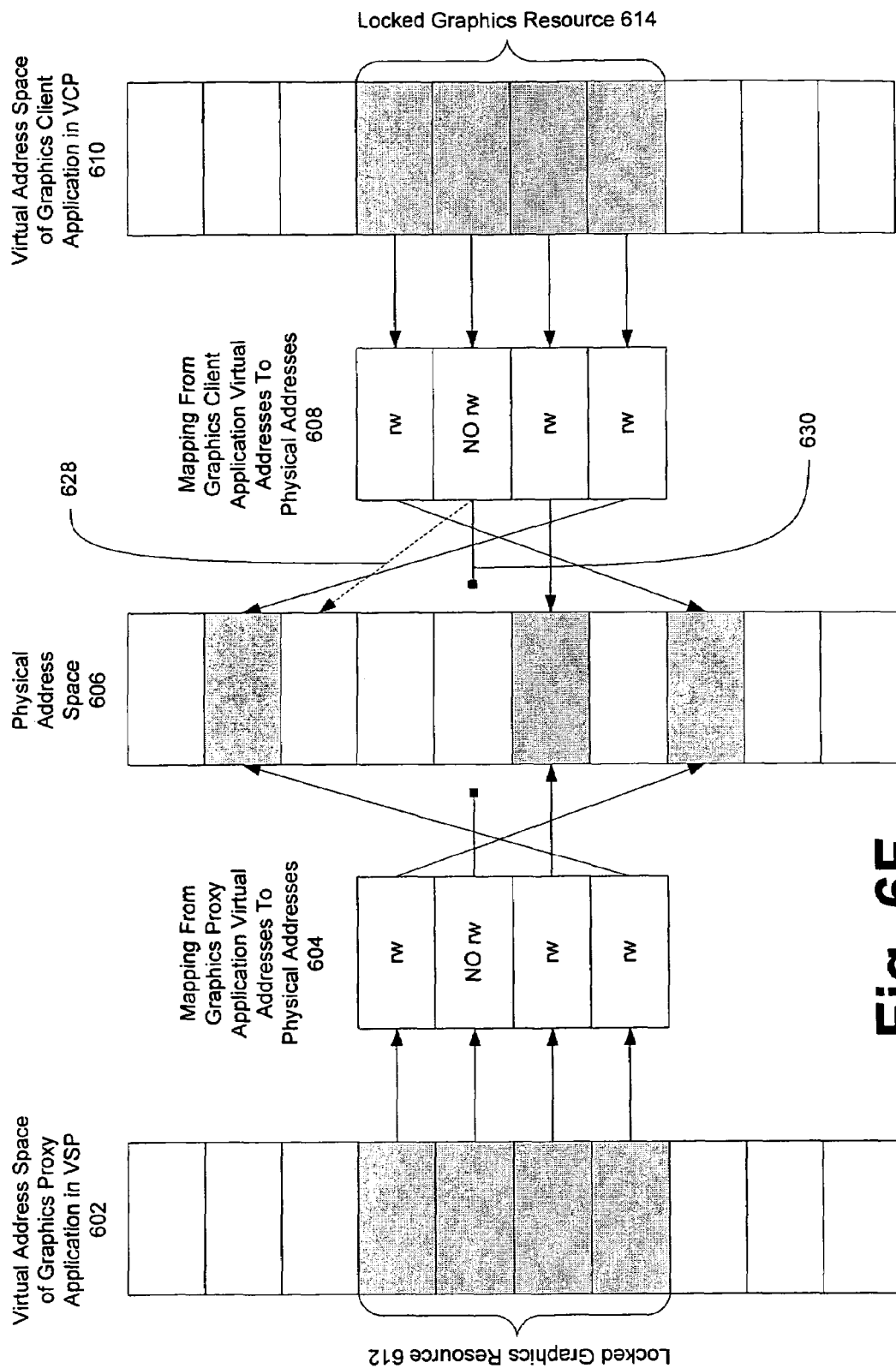

Next, FIG. 6F illustrates that the mapping from the VCP Virtual address 608 should be synchronized with the VSP virtual address mapping 604. Specifically, the old mapping 628 does not correspond to the machine physical address space 606 page that has been paged out. Rather, the new mapping does not have a corresponding machine physical page and nothing can therefore be read or written into that page ("NO rw").

Figure 6G:
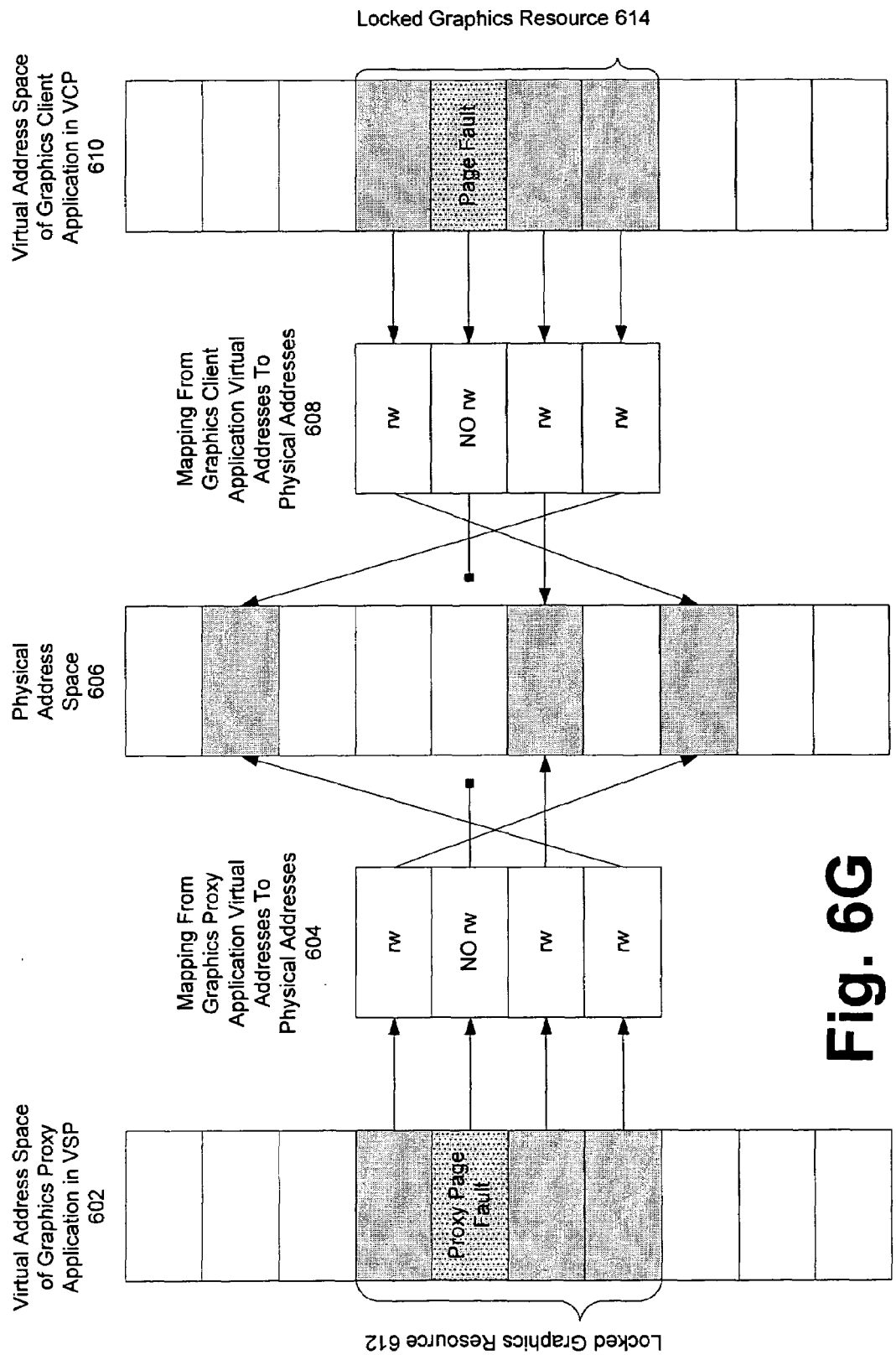

FIG. 6G illustrates a page fault scenario due to an application in the VCP attempting to access a page that has been paged out of physical memory. Thus, a typical application attempts to access a page in the virtual address space of the VCP application 610. Since that particular page has been paged out of machine physical memory 606, there is no corresponding virtual-to-physical mapping 608 ("No rw"). As a result, a page fault occurs. When a page fault occurs in the VCP due to disallowed access to a virtual address that maps to a graphics resource, the page fault is forwarded to the VSP memory manager as if the analogous fault had occurred in the graphics proxy application within the video service partition. This allows the video memory manager in the video service partition to take the appropriate action to make that virtual address usable for the attempted access. If the access is a true fault (e.g. attempting to write to a read-only surface), the graphics proxy application does not fault, but the fault is forwarded back to the VCP and given to ("injected" into) VCP application that originally generated the fault.

Finally, FIG. 6H illustrates how a page fault is handled. The physical page that was paged out of physical memory is paged back into memory. Thus, the old mappings 629 and 630 are replaced by new mappings 632 and 634. As before, first the VSP virtual addresses 602 are mapped to the machine physical addresses 606, and then the relevant VCP virtual address are synchronized to this mapping 604 via mapping 608. However, this is merely an exemplary synchronization—other kinds of synchronizations could also apply, thereby allowing for memory sharing between different partitions.

III. Video Overlay

Figure 7:
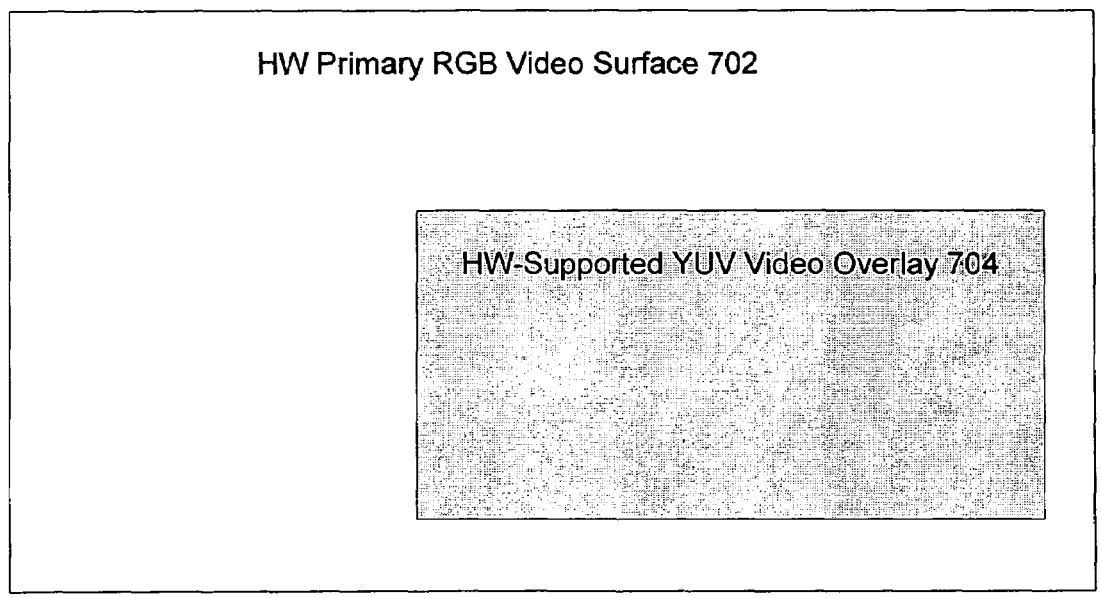
FIG. 7 illustrates a high level overview of overlays.

Video overlays are typically used to display decompressed digital video content. Such content is typically not stored as red, green, and blue data (RGB), but rather it is typically stored as luminance and chrominance data (YUV). FIG. 7 illustrates the notion that video overlays support direct hardware supported display of YUV data on a screen in a rectangle 704 over the rest of the normal RGB data on the screen 702.

Figure 8:
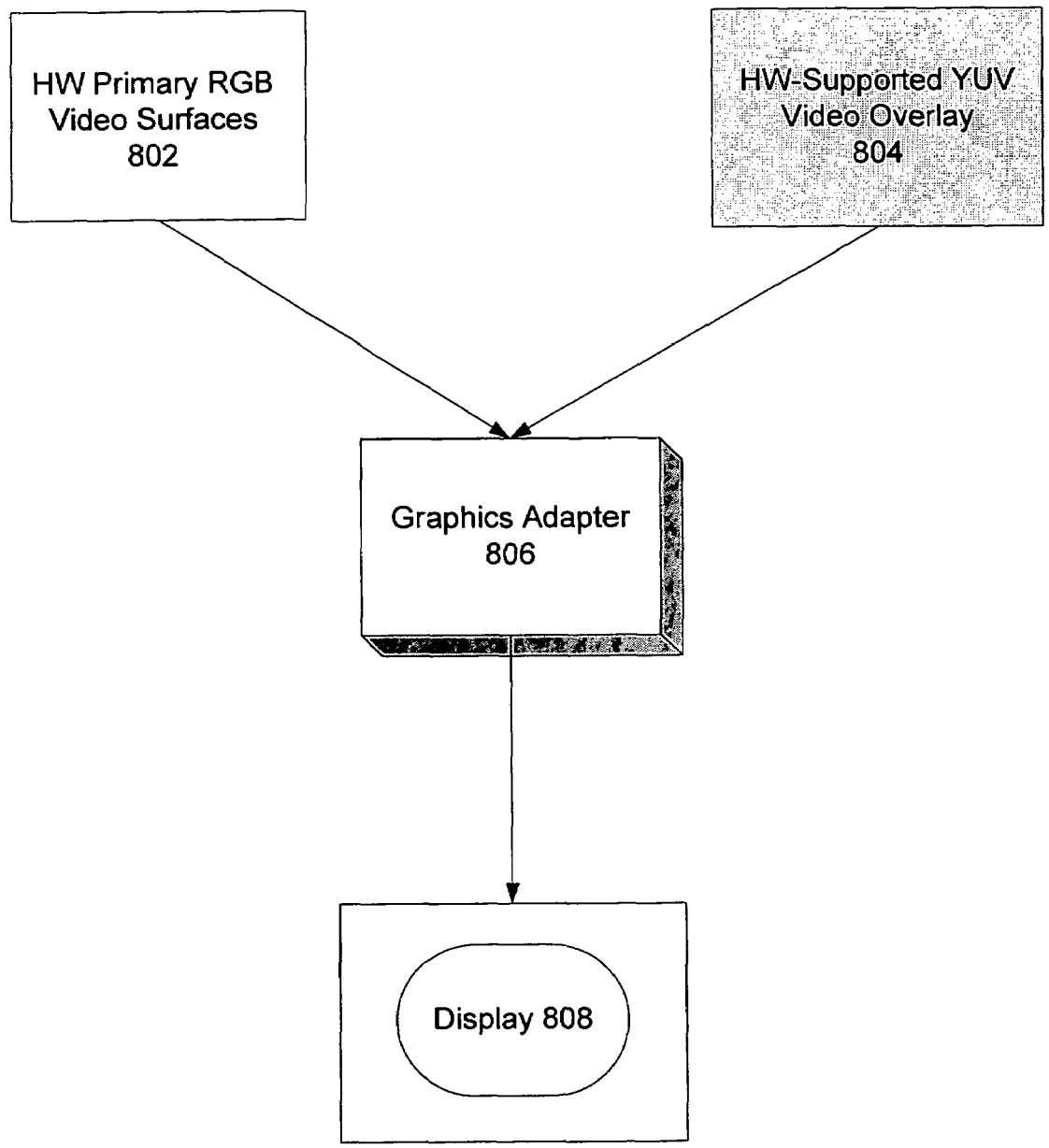
FIG. 8 illustrates how overlays and underlying video surfaces interact with a graphics adapter.

Furthermore, FIG. 8 illustrates the pixel data pathways for normal hardware-supported YUV video overlay. The Hardware Primary RGB video surfaces 802 are provided to a graphics adapter 806 along with the Hardware-Supported YUV video overlay 804. Together, the primary surface data 802 and the video overlay 804 are processed by the graphics adapter 806, and then forwarded from the graphics adapter 806 to some graphical display 808.

Video overlays 804 are displayed as if they replace the RGB data underneath 802, but in fact the underlying RGB 802 data is not affected. Video overlays 804 typically support hardware scaling of the video—up or down in size. Video overlays 804 can typically be moved around and re-sized on the screen 808. Sometimes this capability is used to make it appear as if the video overlay is within a window that is drawn using RGB data. When this video display window is only partially visible (perhaps due to overlap of another window), a technique known as destination chroma-key (or source chroma-key) is used to cause the overlay to only be shown over the portion of the video display that is visible. The chroma-key technique is typically implemented in the graphics adapter hardware. Typically, video overlay brightness, contrast, gamma correction, and other parameters can be adjusted independently of the corresponding parameters that apply to normal RGB data.

Figure 9:
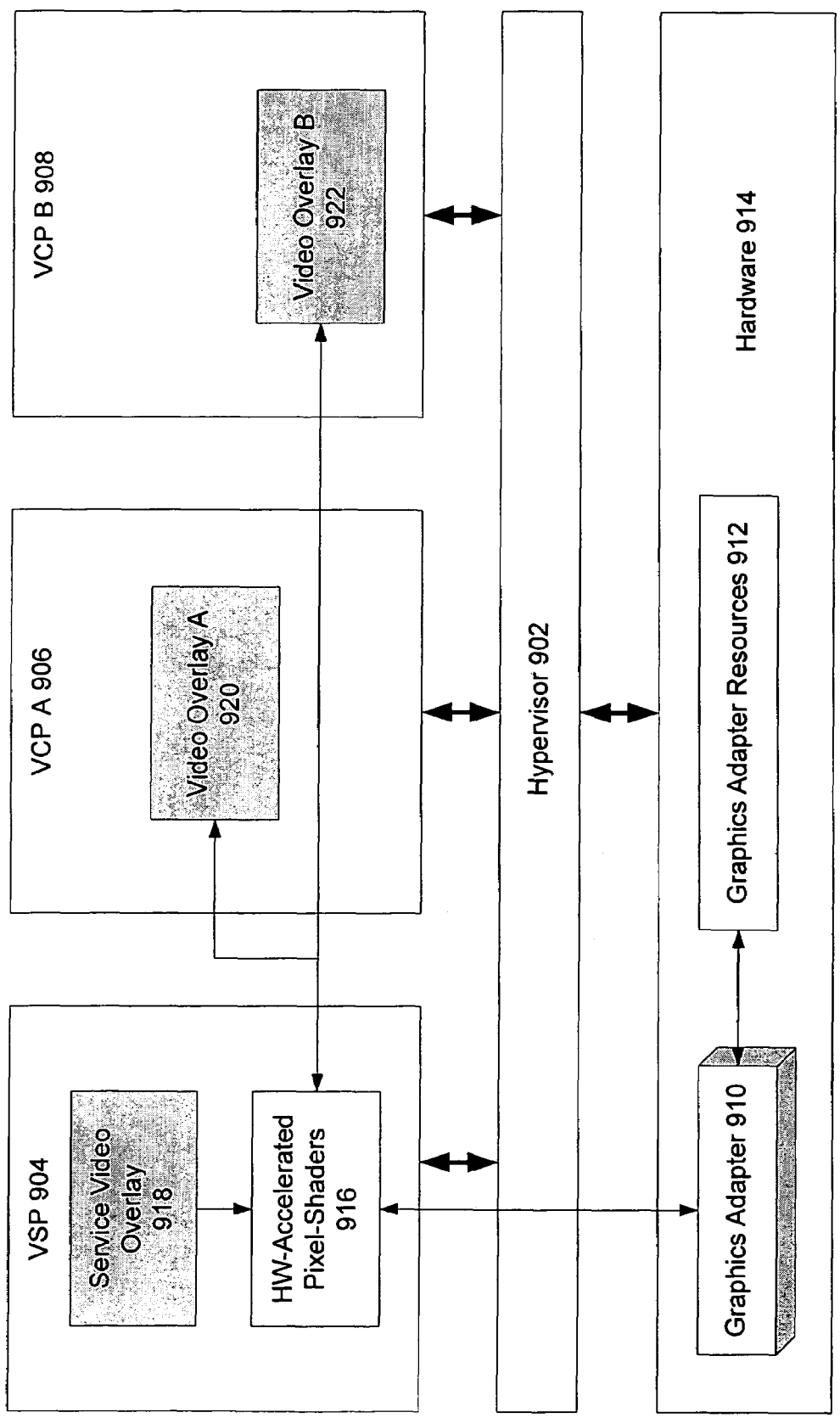
FIG. 9 illustrates how multiple overlays are offered to various partitions.

In one aspect of the subject matter taught herein, FIG. 9 illustrates that multiple video overlays 920 and 922 can be created on the same graphics adapter 910 which means that each VCP is provided with its own video overlay simultaneously. This task is accomplished by creating an emulated video overlays 920 and 922. These emulated video overlays appear to be hardware-supported video overlays to a VCPs 906 and 908. But in fact, they are implemented using pixel shaders 916 and a final composite step of the VCP primary graphics output surface with an emulated video overlay surface. Video overlay scaling, conversion from YUV to RGB, chroma-key, and brightness/contrast/gamma adjustments are implemented using the pixel shaders. The surface flipping and timing semantics of a video overlay are emulated by using multiple separate surfaces or a surface flip chain (but one that is not actually a hardware-supported video overlay). Optionally, the most important, foreground, or visibly largest emulated overlay can be backed by the real hardware-supported video overlay.

For example, if a VCP writes to the video overlay surface in YUV, it does so using the surface sharing mechanism described earlier. If the position and/or size of the overlay is set using overlay manipulation APIs, track of that set information is kept. When it comes time to update the screen (next refresh), that saved information is read and a pixel shader is used, where the pixel shader contains texturing and filtering operations to achieve the scaling of Y, U, and V data each up to the size of the destination RGB rectangle on the screen, and a color space conversion step to get the target resolution YUV pixels into RGB format (in this step gamma and brightness settings may be accounted for). The conversion from YUV to RGB and the scaling steps can be done in either order, but typically the gamma and brightness manipulations are done while still in YUV color space. Preferably, the pixel shader program is part of a larger pixel shader program used to generate each pixel of the rectangular region representing the target overlay rectangle. That larger program would also test the "destination" color of each pixel of the primary surface "under" the overlay destination rectangle, and only if it matches the designated RGB color would it do the rest of the program (scaling and color space conversion). This pixel shader program would not need to be used for pixels that are known up front to be outside the overlay target rectangle. Note that this implementation leads to a "source" primary that doesn't include any overlay pixels, and a "destination" primary that has the overlay pixels mixed in. There may be two "double buffered" copies of the destination primary surface. The "destination" primary (meaning one of it's constituent double-buffered surfaces) can then be directly scanned out to the screen (in "fullscreen mode" of the VM view) by the video card, or can be further composited into a "desktop view window" that can be shown along with other windows. The pixel shader program description above could be done with a few different variations of order with the same end effect.

While the present teachings have been described in connection with the preferred aspects of the subject matter, as illustrated in the various figures, it is understood that other similar aspects may be used or modifications and additions may be made to the described aspects for performing the same function of the present subject matter without deviating therefrom. For example, in one aspect, resource management for virtualization of graphics adapters was discussed. However, other equivalent aspects to these described are also contemplated by the teachings herein. Therefore, the present aspects should not be limited to any single aspect, but rather construed in breadth and scope in accordance with the appended claims.

What is claimed:

1. A method for sharing graphics adapter resources among multiple partitions in a virtual machine environment, comprising:

providing to a first partition a virtual graphics adapter;

providing to a second partition a graphics proxy process, wherein the graphics proxy process owns real graphics resources; and controlling access to the real graphics resources using the graphics proxy process when an application in the first partition requests the real graphics resources by way of the virtual graphics adapter;

wherein the graphics proxy process also manages access of the application in the first partition in view of requests made by an additional application in an additional and separate partition from the first partition by controlling the amount of access time the application in the first partition has to the real graphics resources wherein the amount of access time the first partition has to the real graphics resources is based on a time bank wherein the time bank controls the access time to the real graphics resources between a first proxy graphics device context and a second proxy graphics device context in the second partition.

* * * * *